F. E. RUPF.
SPECIAL CARRIAGE FOR TESTING TYPE WRITERS.
APPLICATION FILED NOV. 27, 1915.
1,200,440.
Patented Oct. 3, 1916.
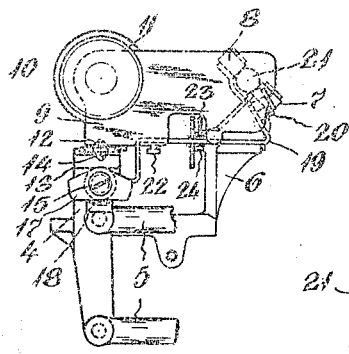
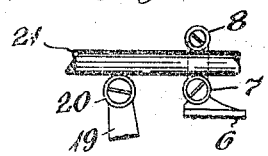
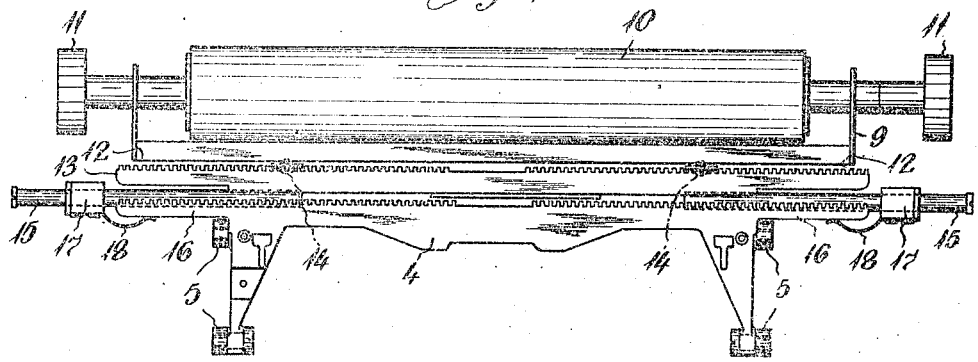
WITNESSES:
INVENTOR
Frank E. Rupf
BY
ATTORNEY

UNITED STATES PATENT OFFICE.

FRANK E. RUPF, OF HARTFORD, CONNECTICUT, ASSIGNOR TO ROYAL TYPEWRITER COMPANY, INC., OF NEW YORK, N. Y., A CORPORATION OF NEW YORK.

SPECIAL CARRIAGE FOR TESTING TYPE-WRITERS.

1,200,440.   Specification of Letters Patent.   Patented Oct. 3, 1916.

Application filed November 27, 1915. Serial No. 63,707.

*To all whom it may concern:*

Be it known that I, FRANK E. RUPF, a citizen of the United States of America, residing in Hartford, in the county of Hartford and State of Connecticut, have invented a certain new and useful Special Carriage for Testing Type-Writers, of which the following is a specification.

This invention relates to a carriage for typewriting machines adapted to be used in place of the regular working carriages when certain parts of the machines are being tested or adjusted. In testing and adjusting operations, for instance setting the trip of the carriage feed, the machines are raised for access to their undersides and lowered to their feet in operating position a great number of times, and thus, by reason of quick changing position movements, shocks are caused between the balls and ball races of the carriage which are liable to mar or indent said ball races and often necessitate refitting same to restore the machine to perfect working condition. The testing carriage of this invention is provided with a bearing that is independent of the working bearing of the carriage of the machine which it replaces, with means by which it may be readily attached to the machine and with means for connection to the carriage feeding devices.

In the accompanying drawings is illustrated only so much of a typewriting machine of the Standard Royal type, with the testing carriage of this invention applied thereto, as is necessary to impart a full understanding of the construction and mode of operation of this invention.

Figure 1 is a front elevation of the carriage attached to the lower rail or bearing ball race of the shift frame of the machine: Fig. 2, an end view of Fig. 1: and Fig. 3 shows a part of the carriage back rail and its supports.

4 designates the carriage shift frame of a machine and 5 its controlling parallel links.

6 is the escapement bracket extending rearwardly from the shift frame 4; 7 the lower roll bearing for the back rail of the carriage; and 8 the upper roll bearing for same.

The testing carriage is, in all essential features, similar to the working carriage which it replaces. It comprises a frame 9 in which is held a rotating platen 10 provided with manipulating knobs 11 in the usual manner. On the under side of the carriage frame 9 is formed a ball race 12, the counter ball race being formed in the upper surface of a bar 13, and between said races are located bearing balls 14 in the usual manner. Secured to the underside of bar 13 are rods 15 which extend beyond the ends of said bar and are adapted to seat in the ball race 16 of the carriage shift frame 4 of the machine. These rods 15 are provided with clamping devices consisting of blocks 17 fitted to slide on rods 15 and spring jaws 18 secured to the undersides of the blocks and adapted to bear on the underside of the ends of the ball race 16 when the rods 15 are seated in the ball race and the blocks 17 slide along the rods toward the center of the machine. This arrangement provides a simple and effective means for quickly applying the auxiliary or substitute testing carriage to any machine when assembled ready to be tested and to have its parts adjusted and for removing it therefrom when the machine is in proper condition to receive its working carriage.

A light bracket 19 extends rearwardly from the lower ball race bar 13 and carries a roller 20 on which the back bearing bar 21 of the testing carriage rests when the carriage is removed from the machine. This bar 21 occupies the same position, relatively to the other parts of the machine, as do the back bearing bars of the regular working carriages, and is controlled by the roller bearings 8 and 7 when the testing carriage is applied to a machine in operative position. This testing carriage is also provided with a hook 22 for receiving the tape of the spring barrel and a feed rack 23 which is engaged by the escape mechanism 24 carried by the bracket 6 of the machine. It will be understood that the machine will be operated in the same manner as it is when in condition for regular use, the testing carriage being actuated in all respects, with regard to its feeding movements, in a manner similar to the working carriages, particularly when used to manipulate the type bar controlling devices in setting and adjusting the trip of the feeding mechanism. It will also be understood that damage or injury to the ball bearing races 12—13 of this testing carriage, due to rough handling of the machine during the testing and adjusting operations, will not materially interfere with such operations.

I claim:

1. A carriage for use in testing and adjusting typewriting machines, comprising a traversing bearing, means for the temporary attachment of the lower part or rail of the traversing bearing to the shift frame of the machine and means for operatively connecting the carriage to the carriage feeding mechanism of the machine.

2. A carriage for use in testing and adjusting typewriting machines, comprising a traversing bearing, a rod extending from each end of the lower section or part of the traversing bearing and adapted to seat in the ball race of the shift frame of the machine and means for clamping said rods to said ball race.

3. A carriage for use in testing and adjusting typewriting machines, comprising a traversing bearing, a rod extending from each end of the lower section or part of the traversing bearing and adapted to seat in the ball race of the shift frame of the machine, a sliding block on each of the rods, a spring clamp on each of the blocks adapted to bear against the under side of the ball race of the shift frame and means for operatively connecting the carriage to the feeding mechanism of the machine.

4. The combination with a typewriting machine of a carriage adapted to be used in place of the ordinary working carriage, having bearings independent of the regular carriage bearings of the machine and provided with means for ready attachment to the machine and means for connection with the feeding mechanism of the machine.

In testimony whereof, I have hereunto subscribed my name.

FRANK E. RUPF.

Witnesses:
ELLEN McCARTHY,
JAMES F. McBIRNEY.